US012522691B2

(12) United States Patent
Shiramizu et al.

(10) Patent No.: US 12,522,691 B2
(45) Date of Patent: Jan. 13, 2026

(54) POST-SYNTHESIS BACKBONE MODIFICATION OF POLYPENTENAMER RUBBER AND RELATED TIRE COMPOSITIONS

(71) Applicant: ExxonMobil Chemical Patents Inc., Baytown, TX (US)

(72) Inventors: Mika L. Shiramizu, Houston, TX (US); Xiao-Dong Pan, Houston, TX (US); Alexander V. Zabula, Seabrook, TX (US); Carlos R. Lopez-Barron, Houston, TX (US); Alan A. Galuska, Huffman, TX (US); Yong Yang, Kingwood, TX (US)

(73) Assignee: ExxonMobil Chemical Patents Inc., Baytown, TX (US)

( * ) Notice: Subject to any disclaimer, the term of this patent is extended or adjusted under 35 U.S.C. 154(b) by 815 days.

(21) Appl. No.: 17/776,945

(22) PCT Filed: Nov. 18, 2020

(86) PCT No.: PCT/US2020/061055
§ 371 (c)(1),
(2) Date: May 13, 2022

(87) PCT Pub. No.: WO2021/101996
PCT Pub. Date: May 27, 2021

(65) Prior Publication Data
US 2023/0002545 A1    Jan. 5, 2023

Related U.S. Application Data

(60) Provisional application No. 62/937,344, filed on Nov. 19, 2019.

(30) Foreign Application Priority Data

Jan. 28, 2020   (EP) .................................... 20154132

(51) Int. Cl.
C08G 61/08   (2006.01)
B60C 1/00    (2006.01)
(Continued)

(52) U.S. Cl.
CPC ............ C08G 61/08 (2013.01); B60C 1/0016 (2013.01); C08F 36/06 (2013.01); C08F 212/08 (2013.01);
(Continued)

(58) Field of Classification Search
None
See application file for complete search history.

(56) References Cited

U.S. PATENT DOCUMENTS 3,607,853 A      9/1971  Oberkirch et al. .......... 260/93.1
2006/0173145 A1*  8/2006  Pawlow ................ C07F 7/1892
                                                     526/279
(Continued)

FOREIGN PATENT DOCUMENTS

CN      105860175        8/2016  ............... B60C 1/00
JP      08283463 A   * 10/1996  ........... B60C 1/0016
(Continued)

OTHER PUBLICATIONS

JP 08283463 A, 1996, machine translation (Year: 1996).*
(Continued)

Primary Examiner — Satya B Sastri

(57) ABSTRACT

Rubber compounds may comprise: an epoxidized polypentenamer rubber (CPR) and/or a hydrolyzed epoxidized CPR; and a filler comprising silica particles. One nonlimiting example is rubber compound comprising: phr to 90 phr of a styrene-butadiene rubber (SBR), a natural rubber (NR), and/or a butadiene rubber (BR); 10 phr to 50 phr of a epoxidized CPR and/or a hydrolyzed epoxidized CPR; and 10 phr to 200 phr of a filler comprising silica particles,
(Continued)

wherein the SBR, the NR, the BR, the epoxidized CPR, and the hydrolyzed epoxidized CPR combined equal 100 parts. Rubber compounds comprising epoxidized CPR and/or a hydrolyzed epoxidized CPR; and a filler comprising silica particles may be useful in tire compositions.

8 Claims, 7 Drawing Sheets

(51) Int. Cl.
*C08F 36/06* (2006.01)
*C08F 212/08* (2006.01)
*C08K 3/36* (2006.01)

(52) U.S. Cl.
CPC ........ *C08K 3/36* (2013.01); *C08G 2261/3321* (2013.01); *C08G 2261/418* (2013.01); *C08G 2261/70* (2013.01)

(56) References Cited

U.S. PATENT DOCUMENTS

| | | | |
|---|---|---|---|
| 2007/0293619 A1* | 12/2007 | Jacoby | C08L 9/06 524/495 |
| 2012/0289646 A1 | 11/2012 | Tsunogae et al. | 524/525 |
| 2017/0190217 A1 | 7/2017 | Joseph et al. | B60C 1/0016 |
| 2017/0233560 A1 | 8/2017 | Kuramoto et al. | C08L 9/06 |
| 2019/0040186 A1 | 2/2019 | Faler | C08G 61/08 |

FOREIGN PATENT DOCUMENTS

| | | | | |
|---|---|---|---|---|
| JP | 2016/079329 | 5/2016 | | B60C 1/00 |
| JP | 2018/168389 | 11/2018 | | C08G 61/08 |
| WO | WO2015/194638 | 4/2017 | | B60C 1/00 |
| WO | WO2018/063313 | 4/2018 | | C08L 15/00 |

OTHER PUBLICATIONS

Neary, W. J. et al. (2019) "Polypentenamer Renaissance: Challenges and Opportunities," *ACS Macro Lett.*, v.8(1), pp. 46-59.

* cited by examiner

POST-SYNTHESIS BACKBONE MODIFICATION OF POLYPENTENAMER RUBBER AND RELATED TIRE COMPOSITIONS

CROSS REFERENCE TO RELATED APPLICATIONS

This application is a National Phase Application of PCT Application No. PCT/US2020/061055 filed Nov. 18, 2020, which claims priority to U.S. Ser. No. 62/937,344, filed Nov. 19, 2019, and EP 20154132.3 filed Jan. 28, 2020, and U.S. Ser. No. 62/937,344 and EP 20154132.3 are herein incorporated by reference.

FIELD

The present disclosure relates to improving the incorporation of silica fillers in tire rubber compounds.

BACKGROUND

In tire rubber compounding, silica filler plays a crucial role to enhance the mechanical properties of the rubber compound including tensile strength and tear resistance. Compared to carbon black fillers, silica fillers provide better cut and flex resistance and heat buildup. However, silica filler has a very low compatibility with rubber because rubbers are hydrophobic and the surface of silica particles are intrinsically hydrophilic due to the presence of silanol groups. Accordingly, silica fillers do not readily disperse in the hydrophobic rubbers and ultimately reduce the modulus and abrasion resistance of the resultant rubber compound.

SUMMARY OF THE INVENTION

The present disclosure relates to improving the incorporation of silica fillers in tire rubber compounds. More specifically, the present disclosure modifies the backbone of polypentenamer rubber (CPR) with polar functional groups that better interact with silica particles, which results in better dispersion of the silica particles in a rubber compound and improved properties of tires produced with said rubber compound.

The present disclosure includes a rubber compound comprising: an epoxidized CPR and/or a hydrolyzed epoxidized CPR; and a filler comprising silica particles.

The present disclosure also includes a rubber compound comprising: 50 phr to 90 phr of a styrene-butadiene rubber (SBR), a natural rubber (NR), and/or a butadiene rubber (BR); and 10 phr to 50 phr of an epoxidized CPR and/or a hydrolyzed epoxidized CPR, wherein the SBR, the NR, the BR, the epoxidized CPR, and the hydrolyzed epoxidized CPR combined equal 100 parts.

The present disclosure also includes a rubber compound comprising: 50 phr to 90 phr of a styrene-butadiene rubber (SBR), a natural rubber (NR), and/or a butadiene rubber (BR); 10 phr to 50 phr of an epoxidized CPR and/or a hydrolyzed epoxidized CPR; and 10 phr to 200 phr of a filler comprising silica particles, wherein the SBR, the NR, the BR, the epoxidized CPR, and the hydrolyzed epoxidized CPR combined equal 100 parts.

The present disclosure also includes a tire comprising any of the foregoing rubber compounds.

The present disclosure also includes a method comprising: contacting a CPR with an oxidant to produce an epoxidized CPR, and optionally contacting the epoxidized CPR with a hydrolyzing agent to produce a hydrolyzed epoxidized CPR.

BRIEF DESCRIPTION OF THE DRAWINGS

The following figures are included to illustrate certain aspects of the embodiments, and should not be viewed as exclusive embodiments. The subject matter disclosed is capable of considerable modifications, alterations, combinations, and equivalents in form and function, as will occur to those skilled in the art and having the benefit of this disclosure.

DETAILED DESCRIPTION

Figure 1:
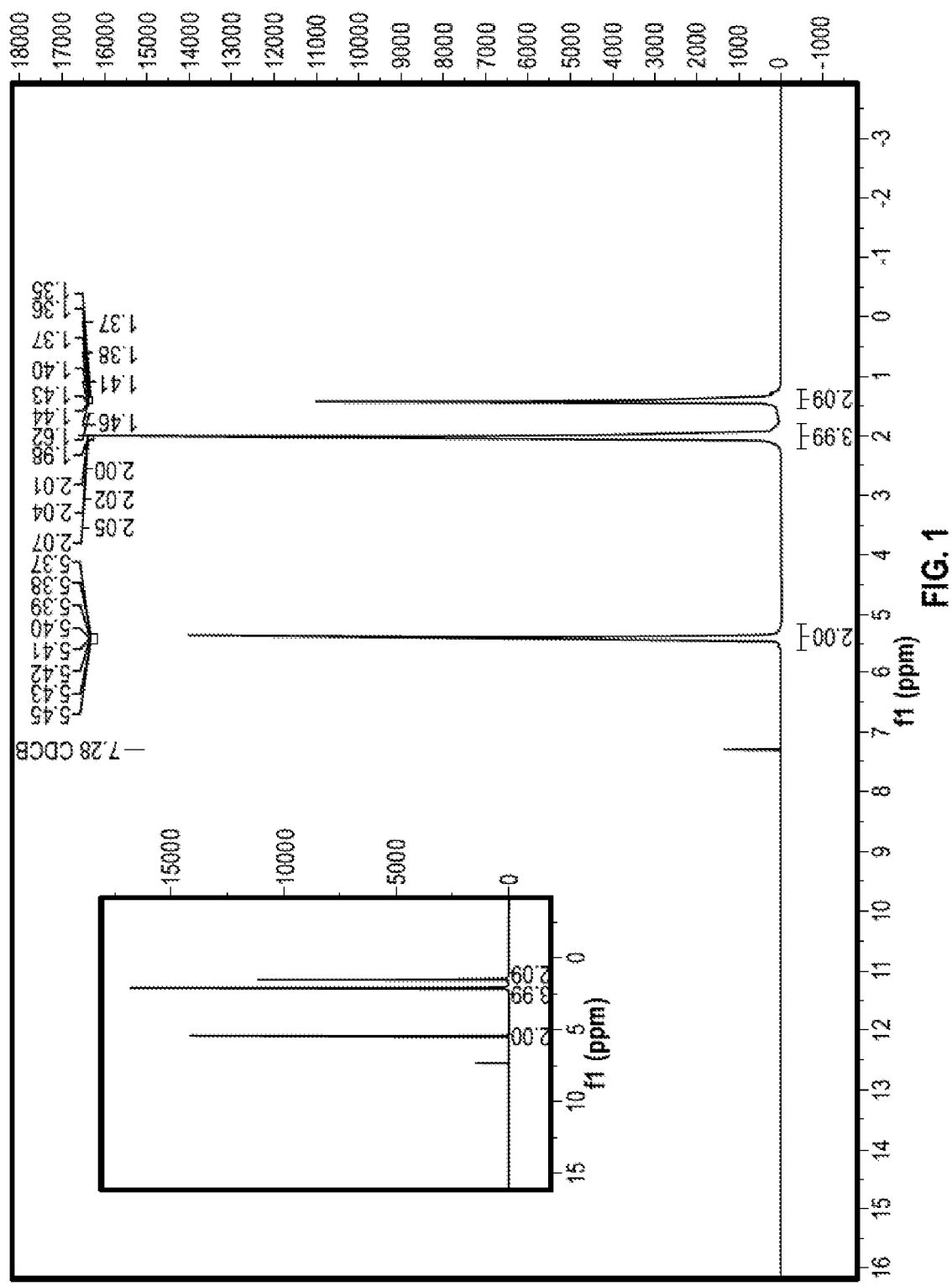
FIG. 1 depicts a $^1$H NMR spectrum collected from a sample of polypentenamer prepared according to Example 1.

The present disclosure relates to improving the incorporation of silica fillers in tire rubber compounds. More specifically, the present disclosure modifies the backbone of polypentenamer rubber (CPR) with polar functional groups that better interact with silica particles, which results in better dispersion of the silica particles in a rubber compound and improved properties of tires produced with said rubber compound.

Epoxidized Polypentenamer Rubber (CPR)

As used herein, when a polymer or copolymer is referred to as comprising an olefin, for example ethylene or cyclopentene, the olefin present in such polymer or copolymer is the polymerized form of the olefin. For example, when a copolymer, is said to have a "cyclopentene" content of 35 wt % to 55 wt %, it is understood that the mer unit in the copolymer is derived from cyclopentene in the polymerization reaction and the derived units are present at 35 wt % to 55 wt %, based upon the weight of the copolymer. A "polymer" has two or more of the same or different mer units. A "homopolymer" is a polymer having mer units that are the same. A "copolymer" is a polymer having two or more mer units that are different from each other.

As used herein, polypentenamer rubber (CPR) is defined as a polymer rubber compound containing a $C_5$ repetitive unit structure derived from cyclopentene ring-opening metathesis polymerization (ROMP), shown below, where n is an integer number greater than one.

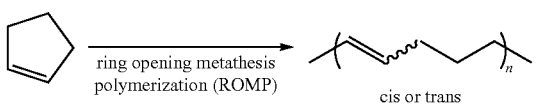

Each pentene mer may have a cis or trans configuration. The terms "cis" and "(Z)" as used herein are used interchangeably and refers to the cis configuration of carbon-carbon double bonds of a polymer backbone. The terms "trans" and "(E)" as used herein are used interchangeably and refers to the trans configuration of carbon-carbon double bonds of a polymer backbone. As used herein "cis content" refers to a mole percent (mol %) of pentene mer units having a cis configuration. For example, when a polymer, is said to have a cis content of 35% to 55%, it is understood that 35 wt % to 55 wt % of pentene mer units have a cis configuration. Similarly, "trans content" refers to a mol % of pentene mer units having a trans configuration. A cis to trans (cis/trans) ratio refers to the ratio of cis content to trans content. For example, if 35% of the pentene mers in a polymer have a cis configuration and 65% of the pentene mers have a trans configuration, the cis/trans ratio would be 35:65.

Polypentenamer rubber may be prepared by any suitable ROMP methods and catalysts, for example, those disclosed in ACS Macro Lett. 2019, 8, 1, 46-59 and U.S. Patent Publication No. 2019/0040186, which is incorporated herein by reference.

For example, polymerization of cyclopentene monomers can be performed by contacting a cyclopentene monomer and optional one or more comonomers with an olefin metathesis catalyst under ROMP conditions. Examples of suitable optional comonomers include norbornene, tetracyclodecene, vinyl norbornene, dicyclopentadiene, ethylidene norbornene, norbornadiene, dicyclopentadiene, cycloheptene, cycloheptene, cyclooctene, cyclooctadiene, cyclododecene, 7-oxanorbornene, 7-oxanorbornadiene, cyclopropene, cyclobutene, cyclohexene, methylcyclohexene, cyclobutadiene, cyclohexadiene, cycloheptadiene, cyclooctatetraene, 1,5-dimethyl-1,5-cyclooctadiene, and their substituted derivatives.

Suitable olefin metathesis catalyst rubber compounds may include a metal, for example, tungsten (W), molybdenum (Mo), rhenium (Re), ruthenium (Ru), titanium (Ti), and/or osmium (Os). For example, a Grubbs catalyst may be used as the olefin metathesis catalyst rubber compound. Optionally, the olefin metathesis catalyst may be a heterogeneous catalyst comprising the olefin metathesis catalyst rubber compounds immobilized on a support material (e.g., silica).

Polymerization reactions may be performed in an inert atmosphere by dissolving a catalytically effective amount of a catalyst in a solvent, and adding the cyclopentene monomer and optionally comonomers, optionally dissolved in a solvent, to the catalyst solution to form a reaction solution. The reaction solution can be agitated (e.g., stirred). The progress of the polymerization occurring in the reaction solution can be monitored by, for example, nuclear magnetic resonance (NMR) spectroscopy.

Solvents useful herein include any suitable organic solvent that is inert under the polymerization conditions. A suitable solvent may include one or more of the following solvents: aromatic hydrocarbons, chlorinated hydrocarbons, ethers, aliphatic hydrocarbons, and alcohols. Preferred solvents include benzene, toluene, p-xylene, methylene chloride, 1,2-dichloroethane, dichlorobenzene, chlorobenzene, tetrahydrofuran, diethylether, pentane, methanol, or ethanol. For example, the solvent can be toluene and/or 1,2-dichloroethane.

Alternatively, polymerization is performed 'neat' (i.e., without the presence of a solvent in a reaction mixture). In neat reactions, the reaction mixture may contain catalyst, cyclopentene monomers, and optional comonomers. Cyclopentene and optional comonomers may act as a diluent for the catalyst and polymer product.

The temperature of the reaction mixture (with solvent or neat) during polymerization may be maintained at any suitable temperature using a standard heating and/or cooling device. Reaction temperatures may range from about 0° C. to about 100° C., such as from about room temperature (23° C.) to about 75° C. A reaction may be facilitated by various well-known techniques (e.g., stirring and/or heating of the reaction mixture) for any suitable amount of time (e.g., until completion of the reaction). For example, the reaction time may be from about 12 hours to about 48 hours, or from about 15 hours to about 24 hours.

The molar ratio of cyclopentene monomers and any comonomers to the catalyst can be selected based on the desired molecular weight of the polymer, desired polydispersity index, and the activity of a particular catalyst.

A resulting CPR comprises pentene and, if included in the reaction mixture, comonomers as described above. The methods and compositions of the present disclosure use an epoxidized CPR or hydrolyzed version thereof (a hydrolyzed epoxidized CPR). Because CPR contains unsaturation, epoxidation of CPR may be carried out by contacting a CPR with an oxidant to produce an epoxidized CPR, for example, as shown below where n=x+y. The epoxide functional group is distributed along the chain (not block) and x and y are the bulk average numbers.

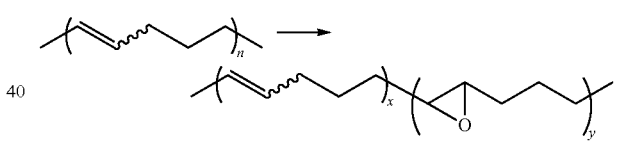

Examples of oxidants include, but are not limited to, potassium hydrogen monopersulfate (e.g., OXONE®, available from Sigma-Aldrich), hydrogen peroxide, dioxiranes, peracetic acid (prepared by mixing acetic acid and/or acetic anhydride with hydrogen peroxide), performic acid (e.g., prepared by mixing formic acid with hydrogen peroxide), ozone, molecular oxygen, and the like, and any combination thereof.

The epoxidation reaction may be carried out in the presence of a suitable solvent. Examples of solvents include, but are not limited to, acetone, acetonitrile, water, chloroform, dichloromethane, toluene, dimethylformamide, and the like, and any combination thereof.

The reaction mixture may be agitated (e.g., stirred) for a desired period until reaction completion. The reaction may be carried out at a temperature of 0° C. to 250° C. (or 20° C. to 40° C., or 23° C. to 30° C.) The reaction time may be up to 40 hours (or 1 minute to 40 hours, or 1 minute to 30 minutes, 5 minutes to 2 hours, 30 minutes to 6 hours, or 2 hours to 12 hours, or 6 hours to 24 hours, or 10 hours to 40 hours).

Optionally, the reaction progress (or the degree of epoxidation or epoxide content) can be monitored by $^1$H NMR where product is washed and dried. The epoxide groups (or hydrolyzed epoxide groups described below) effect the NMR signal of hydrogens on neighboring carbon atoms. The $^1$H NMR signal at about 2.60-2.75 ppm and 2.85-3.0 ppm indicates the presence of epoxide. By comparing a sum of 2.60-2.75 ppm and 2.85-3.0 ppm peak areas ppm signal (indicating epoxide or hydrolyzed epoxide) to a sum of 5.3-5.5 ppm peak areas ppm signal (indicating the unsaturation), a percent conversion of the unsaturation to epoxide (or hydrolyzed epoxide) can be determined by the following equation (area of 2.60-2.75 ppm+area of 2.85-3.0 ppm)/ (area of 2.60-2.75 ppm+area of 2.85-3.0 ppm+area of 5.3-5.5 ppm).

Epoxidized CPR may optionally be further modified, for example, by ring-opening one or more of the epoxide moieties by hydrolysis to generate hydroxyl moieties, as shown below. The net result of such a reaction is the conversion of alkene bonds to vicinal diols.

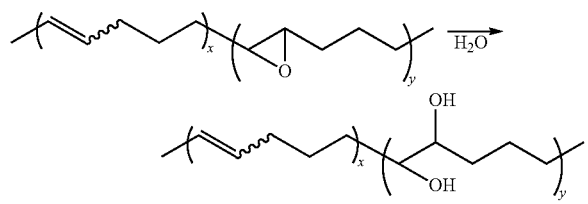

The hydrolysis of epoxidized CPR may be carried out in a suitable solvent in the presence of an acid or a base. Examples of solvents include, but are not limited to, tetrahydrofuran, acetone, acetonitrile, water, chloroform, dichloromethane, toluene, dimethylformamide, and the like, and any combination thereof. Examples of acids include, but are not limited to, sulfuric acid, nitric acid, acetic acid, formic acid, toluene sulfonic acid, and the like, and any combination thereof.

The reaction mixture may be agitated (e.g., stirred) for a desired period until reaction completion. The reaction may be carried out at a temperature of 0° C. to 250° C. (or 20° C. to 40° C., or 23° C. to 30° C.) The reaction time may be up to 40 hours (or 1 minute to 40 hours, or 1 minute to 30 minutes, 5 minutes to 2 hours, 30 minutes to 6 hours, or 2 hours to 12 hours, or 6 hours to 24 hours, or 10 hours to 40 hours).

As used herein, the term "epoxidized CPR" refers to a CPR having epoxide groups. As used herein, the term "hydrolyzed epoxidized CPR" refers to an epoxidized CPR that has been at least partially hydrolyzed and can have hydrolyzed epoxide groups only (fully hydroxylated) or a mixture of hydrolyzed epoxide groups and epoxide groups (partially hydroxylated).

An epoxidized CPR or hydrolyzed epoxidized CPR may be isolated by methods well known in the art, for example, by using an anti-solvent to initiate precipitation or by removing the solvent (e.g., evaporation). Suitable anti-solvents include, but are not limited to, water, methanol, ethanol, isopropanol, and mixtures thereof. If desired, an isolated polymer product may be dried to remove residual solvent. For example, a polymer product may be dried at about 40° C. for a period of up to 3 days.

Epoxidized CPRs and hydrolyzed epoxidized CPRs prepared by methods disclosed herein may have an epoxide content (which is epoxide and hydrolyzed epoxide content) determined by $^1$H NMR as described above comparing 2.60-2.75 and 2.85-3.0 ppm ppm signal to the 5.3-5.5 ppm ppm signal of 0.5% to 30% (or 0.5% to 10%, or 2.5% to 15%, or 5% to 20%, or 10% to about 25%, or 20% to about 30%) based on the number of alkenes converted to epoxides.

The cis-content and trans-content of the epoxidized CPRs and hydrolyzed epoxidized CPRs reported herein is the cis-content and trans-content of the starting CPR. The cis-content and trans-content can be determined by $^{13}$C NMR based on the starting CPR by comparing 129.6-130 pm (cis) ppm signal to the 130.2-130.5 ppm (trans) ppm signal per the following equation cis:trans (mol ratio)=129.6-130 pm peak area:130.2-130.5 ppm peak area.

Epoxidized CPRs and hydrolyzed epoxidized CPRs disclosed herein may have a trans-content of 60% or greater (or 80% or greater, or 60% to 95%, or 80% to 95%, or 70% to 90%, or 60% to 80%) and a cis-content of 40% or less (or 20% or less, or 5% to 40%, or 5% to 20%, or 10% to 30%, or 20% to 40%). Alternatively, Epoxidized CPRs and hydrolyzed epoxidized CPRs disclosed herein may have a trans-content of 50% or less (or 25% or less, or 5% to 50%, or 5% to 20%, or 10% to 25%, or 20% to 50%) and a cis-content of 50% or greater (or 75% or greater or 50% to 95%, or 80% to 95%, or 75% to 90%, or 50% to 80%).

As used herein, Mn is number average molecular weight, Mw is weight average molecular weight, and Mz is z average molecular weight. Polydispersity index (PDI) is the value of Mw divided by Mn. Unless otherwise noted, all molecular weight units (e.g., Mw, Mn, Mz) are g/mol.

Mw, Mn and Mw/Mn are determined by using a High Temperature Gel Permeation Chromatography (Tosoh Bioscience LLC), equipped with a differential refractive index detector (DRI). Three high temperature TSK gel column (Tosoh GMHHR-H(20)HT2) are used. The nominal flow rate is 1.0 mL/min, and the nominal injection volume is 300 μL. The various transfer lines, columns, and dual flow differential refractometer (the DRI detector) are contained in an oven maintained at 160° C. Solvent for the experiment is prepared by dissolving 1.2 grams of butylated hydroxytoluene as an antioxidant in 4 liters of Aldrich reagent grade 1, 2, 4 trichlorobenzene (TCB). The TCB mixture is then filtered through a 0.1 μm Teflon filter. The TCB is then degassed with an online degasser before entering the GPC instrument. Polymer solutions are prepared by placing dry polymer with about 10~15 wt % anti-oxidants of Irganox 1076 and Irgafos 168 in glass vials, adding the desired amount of TCB, and then heating the mixture at 160° C. with continuous shaking for about 1 hour. All quantities are measured gravimetrically. The injection concentration is from 0.4 to 0.7 mg/mL, with lower concentrations being used for higher molecular weight samples. Flow rate in the apparatus is then increased to 1.0 mL/minute, and the DRI is allowed to stabilize for 2 hours before injecting the first sample. The molecular weight is determined relatively to polystyrene molecular weight that the column calibration is performed with a series of monodispersed polystyrene standards. All molecular weights are reported in g/mol unless otherwise noted.

Rubber Compounds Comprising Epoxidized CPR and Hydrolyzed Epoxidized CPRs

The epoxide and/or hydroxide groups of the epoxidized CPRs and hydrolyzed epoxidized CPRs advantageously have an affinity for the silanol groups at the surface of silica particles (also referred to herein simply as silica). This affinity advantageously will provide better dispersion of silica particles in rubber compounds. It has also been observed that epoxidized CPRs and hydrolyzed epoxidized CPRs have greater miscibility with styrene-butadiene rubber (SBR), natural rubber (NR), and butadiene rubber (BR).

This is surprising because said rubbers are hydrophobic and the epoxidation of CPR increases the hydrophilicity of CPR. The improved dispersion of silica particles and improved miscibility with SBR, NR, and BR make rubber compounds epoxidized CPRs and hydrolyzed epoxidized CPRs attractive for use in tire treads.

As used herein, "phr" means "parts per hundred parts rubber," where the "rubber" is the total rubber content of the composition. Herein, epoxidized CPR, hydrolyzed epoxidized CPR, and other rubbers (including those described herein) are considered to contribute to the total rubber content, such that in compositions where both are present, the "total rubber" is the combined weight of all rubbers in the rubber compound. Thus, for example, a composition having 30 parts by weight of epoxidized CPR and/or hydrolyzed epoxidized CPR and 70 parts by weight of SBR, NR, and/or BR may be referred to as having 30 phr epoxidized CPR and/or hydrolyzed epoxidized CPR and 70 phr SBR, NR, and/or BR. Other components added to the composition are calculated on a phr basis. For example, addition of 50 phr of silica to a composition means that 50 g of silica are present in the composition for every 100 g of the SBR, NR, BR, epoxidized CPR, and hydrolyzed epoxidized CPR combined. Unless specified otherwise, phr should be taken as phr on a weight basis.

Rubber compounds described herein comprise epoxidized CPRs and/or hydrolyzed epoxidized CPRs of the present disclosure and filler particles (also referred to herein simply as filler). Examples of fillers include, but are not limited to, carbon black, calcium carbonate, clay, mica, silica, silicates, talc, titanium dioxide, aluminum oxide, zinc oxide, starch, wood flour, and the like, and any combination thereof. Silica is a preferred filler. The fillers may be any size and typically range, for example in the tire industry, from about 0.0001 μm to about 100 μm.

The filler may be carbon black or modified carbon black. Examples of carbon black include, but are not limited to, N229, N351, N339, N220, N234, N110 N326, N330, N347, N351, N550, N650, N990, N660, and N762 provided in ASTM D3037-93, ASTM D1510-19, and ASTM D3765-04.

The clay may be, for example, montmorillonite, nontronite, beidellite, vokoskoite, laponite, hectorite, saponite, sauconite, magadite, kenyaite, stevensite, vermiculite, halloysite, aluminate oxides, hydrotalcite, or mixtures thereof, optionally, treated with modifying agents. The clay may contain at least one silicate. Alternatively, the filler may be a layered clay, optionally, treated or pre-treated with a modifying agent such as organic molecules; the layered clay may comprise at least one silicate.

As used herein, silica refers to any type or particle size silica or another silicic acid derivative, or silicic acid, processed by solution, pyrogenic, or like methods, including untreated, precipitated silica, crystalline silica, colloidal silica, aluminum or calcium silicates, fumed silica, and the like. Precipitated silica can be conventional silica, semi-highly dispersible silica, or highly dispersible silica. An example of commercially available silica is ZEOSIL® 1165MP (amorphous precipitated silica, available from Solvay).

The silicate may comprise at least one "smectite" or "smectite-type clay" referring to the general class of clay minerals with expanding crystal lattices. For example, this may include the dioctahedral smectites which consist of montmorillonite, beidellite, and nontronite, and the trioctahedral smectites, which include saponite, hectorite, and sauconite. Also encompassed are synthetically prepared smectite-clays.

The silicate may comprise natural or synthetic phyllosilicates, such as montmorillonite, nontronite, beidellite, bentonite, volkonskoite, laponite, hectorite, saponite, sauconite, magadite, kenyaite, stevensite, and the like, as well as vermiculite, halloysite, aluminum oxides, hydrotalcite, and the like. Combinations of any of the above discussed silicates are also contemplated.

One or more silane coupling agents are used in the rubber compounds of the present disclosure. Coupling agents are particularly desirable when silica is the primary filler, or is present in combination with another filler, as they help bind the silica to the elastomer. The coupling agent may be a bifunctional organosilane crosslinking agent. An "organosilane crosslinking agent" is any silane coupled filler and/or crosslinking activator and/or silane reinforcing agent known to those skilled in the art including, but not limited to, vinyl triethoxysilane, vinyl-tris-(beta-methoxyethoxy)silane, methacryloylpropyltrimethoxysilane, gamma-amino-propyl triethoxysilane, gamma-mercaptopropyltrimethoxysilane, and the like, and mixtures thereof. An example of a commercially available silane is X50-S® (bis(triethoxysilylpropyl)tetrasulfide with carbon black, available from Evonik Industries).

Fillers may be present in rubber compounds described herein at 10 phr to 200 phr (or 50 phr to 150 phr, or 50 phr to 100 phr).

Rubber compounds of the present disclosure may also comprise one or more of: SBR, natural rubber (NR), and butadiene rubber (BR).

Rubber compounds of the present disclosure may comprise 50 phr to 90 phr (or 50 phr to 70 phr, or 60 phr to 80 phr, or 70 phr to 90 phr) of a SBR, NR, and/or BR; 10 phr to 50 phr (or 10 phr to 30 phr, or 20 phr to 40 phr, or 30 phr to 50 phr)) of an epoxidized CPR and/or a hydrolyzed epoxidized CPR, wherein the SBR, NR, BR, epoxidized CPR, and hydrolyzed epoxidized CPR combined equal 100 parts; and 10 phr to 200 phr (or 50 phr to 150 phr, or 50 phr to 100 phr) of a filler (preferably silica). Said rubber compounds may be useful in tire tread formulations.

The rubber compounds of the present disclosure contain other components and additives customarily used in rubber compounds, such as effective amounts of processing aids, pigments, accelerators, crosslinking and curing materials, antioxidants, antiozonants, and the like, and any combination thereof.

The rubber compounds of the present disclosure and the articles made from those compositions are generally manufactured with the aid of at least one cure package, at least one curative, at least one crosslinking agent, and/or undergo a process to cure the rubber compound. As used herein, at least one curative package refers to any material or method capable of imparting cured properties to a rubber as is commonly understood in the industry.

Generally, rubber compounds are crosslinked to improve the mechanical properties of the polymer. Physical properties, performance characteristics, and durability of vulcanized rubber compounds are known to be related to the number (crosslink density) and type of crosslinks formed during the vulcanization reaction. The rubber compounds of the present disclosure may be crosslinked by adding curative agents, for example, sulfur, metals, metal oxides, such as zinc oxide, peroxides, organometallic rubber compounds, radical initiators, fatty acids, and other agents common in the art. Other known methods of curing that may be used include, peroxide cure systems, resin cure systems, and heat or radiation-induced crosslinking of polymers. Accelerators, activators, and retarders may also be used in the curing process.

The compositions may be vulcanized (cured) by any suitable means, such as subjecting them to heat or radiation according to any conventional vulcanization process. The amount of heat or radiation needed is that which is required to affect a cure in the composition, and the disclosure is not herein limited by the method and amount of heat required to cure the composition. Typically, the vulcanization is conducted at a temperature ranging from 100° C. to about 250° C., or 150° C. to 200° C., for 1 to 150 minutes.

Halogen-containing rubbers may be crosslinked by their reaction with metal oxides. Examples of useful metal oxides include, but are not limited to, ZnO, CaO, and PbO. The metal oxide can be used alone or in conjunction with its corresponding metal fatty acid complex (e.g., zinc stearate, calcium stearate, etc.), or with the organic and fatty acids added alone, such as stearic acid, and optionally other curatives, such as sulfur or a sulfur rubber compound, an alkylperoxide rubber compound, diamines, or derivatives thereof.

Sulfur is the most common chemical vulcanizing agent for diene-containing rubbers. The sulfur vulcanization system may consist of an activator to activate the sulfur, an accelerator, and a retarder to help control the rate of vulcanization.

Activators are chemicals that increase the rate of vulcanization by reacting first with the accelerators to form rubber-soluble complexes that then react with the sulfur to form sulfurating agents. General classes of accelerators include amines, diamines, guanidines, thioureas, thiazoles, thiurams, sulfenamides, sulfenimides, thiocarbamates, xanthates, and the like.

Accelerators help control the onset and rate of vulcanization, and the number and type of crosslinks that are formed. Retarders may be used to delay the initial onset of cure in order to allow sufficient time to process the unvulcanized rubber.

The acceleration of the vulcanization process may be controlled by regulating the amount of the acceleration accelerant, often an organic rubber compound. The mechanism for accelerated vulcanization of SBR, NR, and BR involves complex interactions between the curative, accelerator, activators, and polymers. Ideally, the entire available curative is consumed in the formation of effective crosslinks that join together two polymer chains and enhance the overall strength of the polymer matrix. Numerous accelerators are known in the art and include, but are not limited to, the following: stearic acid, diphenyl guanidine (DPG), tetramethylthiuram disulfide (TMTD), benzothiazyl disulfide (MBTS), N-t-butyl-2-benzothiazole sulfenamide (TBBS), N-cyclohexyl-2-benzothiazole-sulfenamide (CBS), and thioureas.

Curing agents may be present in the rubber compounds of the present disclosure at 0.2 phr to 10 phr, or 0.5 phr to 5 phr, or 0.75 phr to 2 phr.

The rubber compounds of the present disclosure may be rubber compounded (mixed) by any conventional means known to those skilled in the art. The mixing may occur in a single step or in multiple stages. For example, the ingredients are typically mixed in at least two stages, namely at least one non-productive stage followed by a productive mixing stage. The final curatives are typically mixed in the final stage, which is conventionally called the "productive" mix stage. In the productive mix stage, the mixing typically occurs at a temperature, or ultimate temperature, lower than the mix temperature(s) of the preceding non-productive mix stage(s). The rubbers, polymer additives, silica and silica coupler, and carbon black, if used, are generally mixed in one or more non-productive mix stages. The terms "non-productive" and "productive" mix stages are well known to those having skill in the rubber mixing art.

The carbon black can be added in a different stage from zinc oxide and other cure activators and accelerators. For example, antioxidants, antiozonants, and processing materials are added in a stage after the carbon black has been processed with the rubbers, and zinc oxide is added at a final stage to maximize the rubber compound modulus. In another example, mixing with the clays is performed by techniques known to those skilled in the art, wherein the clay is added to the polymer at the same time as the carbon black. Further, additional stages may involve incremental additions of one or more fillers.

An example of a commercially available zinc oxide is KADOX® 911 (zinc oxide, available from Cary Company). Examples of commercially available antioxidants include, but are not limited to, SANTOFLEX™ 6PPD (No(1,3-dimethylbutyl)-N'-phenyl-p-phenylenediamine antioxidant, available from Eastman Chemical), AGERITE® RESIN D® (polymerized 1,2-dihydro-2,2,4-trimethylquinoline antioxidant, available from Vanderbilt Chemicals), and the like.

In another example, mixing of the components may be carried out by combining the rubber components, filler and clay in any suitable mixing device, such as a two-roll open mill, BRABENDER™ internal mixer, BANBURY™ internal mixer with tangential rotors, Krupp internal mixer with intermeshing rotors, or preferably a mixer/extruder, by techniques known in the art. Mixing may be performed at temperatures up to the melting point of the rubber(s) used in the composition for example, or 40° C. to 250° C., or 100° C. to 200° C. Mixing should generally be conducted under conditions of shear sufficient to allow the clay to exfoliate and become uniformly dispersed within the rubber(s).

Typically, from 70% to 100% of the rubber is first mixed for 20 to 90 seconds, or until the temperature reaches from 40° C. to 75° C. Then, approximately 75% of the filler, and the remaining amount of rubber, if any, are typically added to the mixer, and mixing continues until the temperature reaches from 90° C. to 150° C. Next, the remaining filler is added, as well as the processing aids, and mixing continues until the temperature reaches from 140° C. to 190° C. The masterbatch mixture is then finished by sheeting on an open mill and allowed to cool, for example, to from 60° C. to 100° C. when curatives may be added.

Processing aids include isoparaffins, polyalphaolefins ("PAOs") and polybutenes (a subgroup of PAOs). These three classes of rubber compounds can be described as paraffins, which can include branched, cyclic, and normal structures, and blends thereof. These processing aids can be described as comprising $C_6$ to $C_{200}$ paraffins in one embodiment, and $C_8$ to $C_{100}$ paraffins in another embodiment.

Other processing aids can include esters, polyethers, and polyalkylene glycols. Other processing aids may be present or used in the manufacture of the rubber compositions of the invention. Processing aids include, but are not limited to, plasticizers, tackifiers, extenders, chemical conditioners, homogenizing agents and peptizers such as mercaptans, petroleum and vulcanized vegetable oils, mineral oils, paraffinic oils, polybutene aids, naphthenic oils, aromatic oils, waxes, resins, rosins, and the like.

Examples of commercially available processing aids include, but are not limited to, NYTEX® 4700 (naphthenic processing oil, available from Nynas), NOCHEK® 4756A (paraffin wax blend, available from Sovereign Chemicals), and the like.

When included, the processing aid is typically present or used in the manufacturing process from 1 phr to 70 phr, or 3 phr to 60 phr, or 5 phr to 50 phr.

The rubber compounds described herein may be formed using conventional equipment and methods, such as by dry blending the individual components and subsequently melt mixing in a mixer, or by mixing the components together directly in a mixer, such as, for example, a BANBURY® mixer (available from Farrel Pomini), a HAAKE® mixer (available from Thermofisher), a BRABENDER® internal mixer (available from Brabender GmbH), or a single or twin-screw extruder, which may include a compounding extruder and a side-arm extruder used directly downstream of a polymerization process, which may include blending powders or pellets of the resins at the hopper of the film extruder.

Dynamic properties (G*, G', G", and tan delta (tan δ)) can be used as predictors of tire traction. More specifically, the major peak for the tan δ measurements ($T_{pk\ tan\ \delta}$ and the complex modulus (G*) of rubber compounds can be used as a predictor of winter traction of the rubber compound if used in the production of tire treads.

A strain controlled rheomether ARES-G2 (TA Instrument) fitted with a liquid $N_2$ cooling accessory and an 8 mm serrated parallel plates assembly was used to measure the thermo-mechanical performance (in torsional mode) of disks of the copolymer. The disks were prepared by molding a plaque of the copolymer in a hot press and subsequently cutting disks from the plaque with a circular hole punch of 8 mm in diameter. Samples were loaded at 100° C. and cooled to −150° C. at a cooling rate of 10° C./min. After equilibration, a dynamic temperature sweep experiment was performed using the following conditions: a constant frequency of 1 Hz and strain of 0.1%, and a heating rate of 2° C./min. A constant compression axial force of 0.5 N was applied to avoid normal force development on the rheometer tranducer due to thermal expansion of the plates and the sample. The Dynamic Mechanical Thermal Analysis (DMTA) measurement gives storage modulus (G', elastic response modulus) and loss modulus (G", viscous response modulus); the ratio of loss to storage moduli at a given temperature is tan δ (i.e., tan δ=G"/G'). The complex modulus, G*, is computed as $G^*=\sqrt{G'^2+G''^2}$. The tan δ peak is associated with the glass transition (temperature of the brittle-ductile transition).

Rubber compounds described herein may be characterized by a $T_{pk\ tan\ \delta}$ of −25° C. to −15° C. (or −20° C. to −15° C.).

Rubber compounds described herein may be characterized by G* at −20° C. of 25 MPa and 200 MPa (or 25 MPa to 100 MPa, or 50 MPa to 150 MPa, or 100 MPa to 200 MPa).

EXAMPLE EMBODIMENTS

A first nonlimiting example embodiment of the present disclosure is a rubber compound comprising: an epoxidized CPR and/or a hydrolyzed epoxidized CPR; and a filler comprising silica particles. Said example embodiment may further include one or more of: Element 1: wherein the epoxidized CPR and/or the hydrolyzed epoxidized CPR has a trans content of 60% or greater; Element 2: wherein the epoxidized CPR and/or the hydrolyzed epoxidized CPR has a trans content of 80% or greater; Element 3: wherein the epoxidized CPR and/or the hydrolyzed epoxidized CPR has a cis content of 50% or greater; Element 4: wherein the epoxidized CPR and/or the hydrolyzed epoxidized CPR has a cis content of 75% or greater; Element 5: wherein the epoxidized CPR and/or the hydrolyzed epoxidized CPR has an epoxide content of 0.5% to 30% based on a number of alkenes converted to epoxides; Element 6: wherein the silica is present at 10 phr to 200 phr; Element 7: the rubber compound comprising: 50 phr to 90 phr of a SBR, a NR, and/or a BR; and 10 phr to 50 phr of the epoxidized CPR and/or the hydrolyzed epoxidized CPR, wherein the SBR, the NR, the BR, the epoxidized CPR, and the hydrolyzed epoxidized CPR combined equal 100 parts; Element 8: Element 7 and the rubber compound further comprising one or more of the following: a processing aid, a pigment, an accelerator, a crosslinking and curing material, an antioxidant, and an antiozonant; Element 9: Element 7 and the rubber compound having tan delta of −25° C. to −15° C.; Element 10: Element 7 and the rubber compound having a G* at −20° C. of 25 MPa to 200 MPa. Examples of combinations include, but are not limited to, one of Elements 1-4 in combination with one or more of Elements 5-10; Elements 5 and 6 in combination; Element 7 and optionally one or more of Elements 8-10 in combination with Element 5 and/or Element 6; and Element 7 in combination with one or more of Elements 8-10.

A second nonlimiting example embodiment of the present disclosure is a tire comprising the rubber compound of the first nonlimiting example embodiment, which may include one or more of Elements 1-10 including in the foregoing combinations.

A third nonlimiting example embodiment of the present disclosure is a method comprising: contacting a CPR with an oxidant to produce an epoxidized CPR. Said example embodiment may further include one or more of: Element 1; Element 2; Element 3; Element 4; Element 5; Element 11: wherein the oxidant is potassium hydrogen monopersulfate, hydrogen peroxide, dioxiranes, peracetic acid, performic acid), ozone, molecular oxygen, and any combination thereof; Element 12: the method further comprising contacting the epoxidized CPR with a hydrolyzing agent to produce a hydrolyzed epoxidized CPR; Element 13: Element 12 and wherein the hydrolyzing agent comprises an acid or a base; Element 14: the method further comprising rubber compounding the epoxidized CPR and/or the hydrolyzed epoxidized CPR with a filler comprising silica particles; Element 15: the method further comprising rubber compounding the epoxidized CPR and/or the hydrolyzed epoxidized CPR with a SBR, a NR, and/or a BR to form a rubber compounded composition; Element 16: Element 15 and wherein the rubber compounded composition comprises 50 parts per hundred pounds of rubber (phr) to 90 phr of the SBR, the NR, and/or the BR and 10 phr to 50 phr of the epoxidized CPR and/or the hydrolyzed epoxidized CPR, wherein the SBR, the NR, the BR, the epoxidized CPR, and the hydrolyzed epoxidized CPR combined equal 100 parts; and Element 17: Element 15 and the method further comprising adding to the rubber compounded composition one or more of the following: a processing aid, a pigment, an accelerator, a crosslinking and curing material, an antioxidant, and an antiozonant. Examples of combinations include, but are not limited to, one of Elements 1-4 in combination with Element 5; one of Elements 1-4 in combination with Element 11 and/or Element 12 (optionally in combination with Element 13); Element 12 and optionally Element 13 in combination with Element 11; one of Elements 1-4 in combination with one or more of Elements 14-17; and one or more of Elements 11-13 in combination with one or more of Elements 14-17 and optionally in further combination with one of Elements 1-4 and/or Element 5.

Unless otherwise indicated, all numbers expressing quantities of ingredients, properties such as molecular weight, reaction conditions, and so forth used in the present specification and associated claims are to be understood as being modified in all instances by the term "about." Accordingly, unless indicated to the contrary, the numerical parameters set forth in the following specification and attached claims are approximations that may vary depending upon the desired properties sought to be obtained by the embodiments of the present invention. At the very least, and not as an attempt to limit the application of the doctrine of equivalents to the scope of the claim, each numerical parameter should at least be construed in light of the number of reported significant digits and by applying ordinary rounding techniques.

One or more illustrative embodiments incorporating the invention embodiments disclosed herein are presented herein. Not all features of a physical implementation are described or shown in this application for the sake of clarity. It is understood that in the development of a physical embodiment incorporating the embodiments of the present invention, numerous implementation-specific decisions must be made to achieve the developer's goals, such as compliance with system-related, business-related, government-related and other constraints, which vary by implementation and from time to time. While a developer's efforts might be time-consuming, such efforts would be, nevertheless, a routine undertaking for those of ordinary skill in the art and having benefit of this disclosure.

While compositions and methods are described herein in terms of "comprising" various components or steps, the compositions and methods can also "consist essentially of" or "consist of" the various components and steps.

To facilitate a better understanding of the embodiments of the present invention, the following examples of preferred or representative embodiments are given. In no way should the following examples be read to limit, or to define, the scope of the invention.

EXAMPLES

Figure 2:
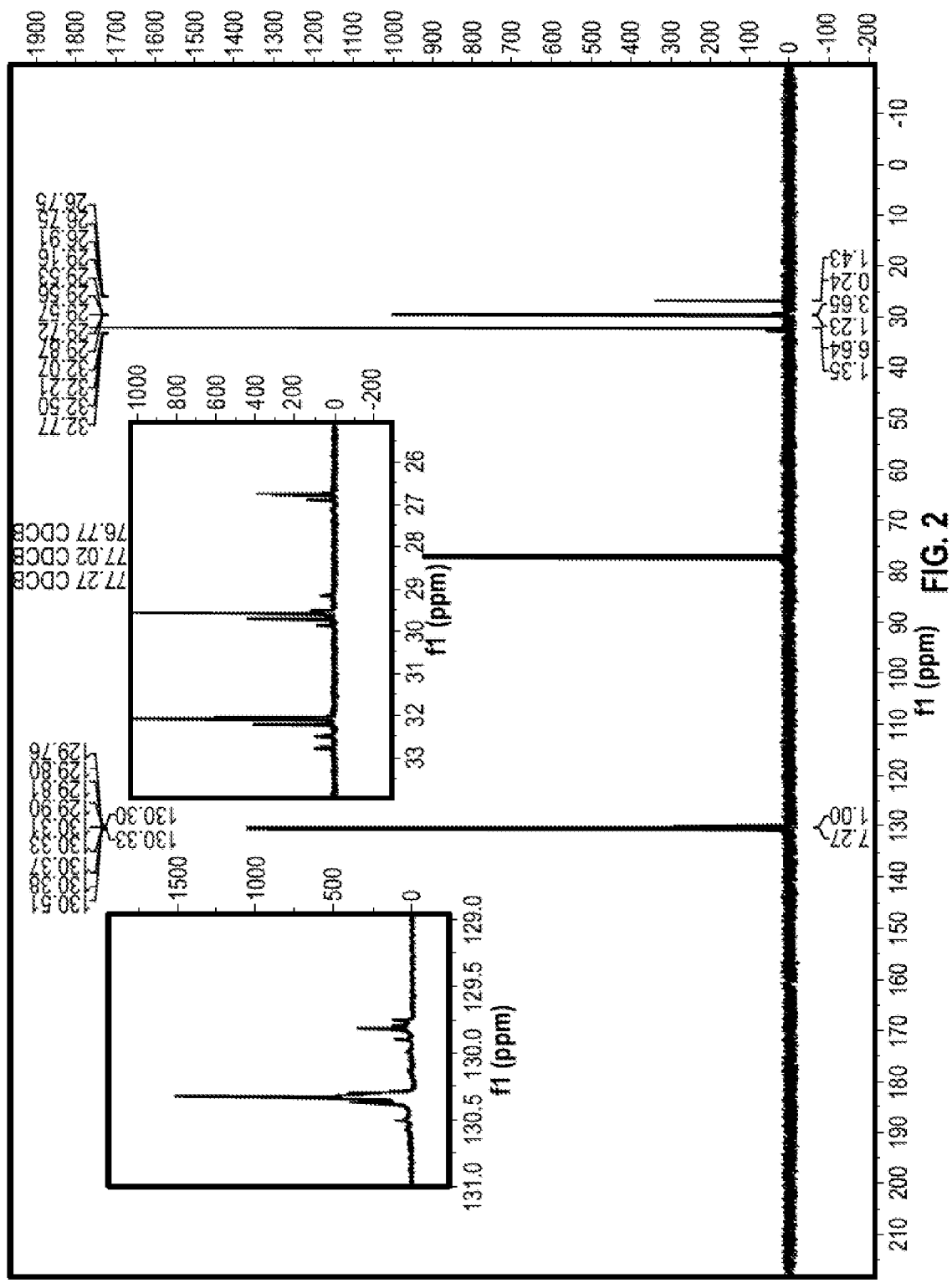
FIG. 2 depicts a $^{13}$C NMR spectrum collected from a sample of polypentenamer prepared according to Example 1.

Example 1. Homopolymer Synthesis. Benzene (3000 g) and cyclopentene (960 g) were combined in a 4 L jacketed reactor, which was then cooled to a temperature of close to 0° C. In a 50 mL flask, toluene (20 g) and tungsten hexachloride (3 g) were combined. In a separate 20 mL flask, toluene (2 g) and tert-butyl hypochlorite (0.821 g) were combined then added to the contents of the 50 mL flask. The combined mixture was stirred for 15 minutes at room temperature while sparging with nitrogen. A solution of aluminum triisobutylaluminum (2.62 g) in toluene (12 mL) was then added to the combined mixture, which was then added to the jacketed reactor. The reactor temperature was increased to about 16° C. to yield a viscous mixture. The mixture was stirred at about 500 rpm for about 3 hours, maintaining the temperature at about 12° C. In a round bottom flask, butylated hydroxytoluene (5 g), ethanol (25 mL), and benzene (400 mL) were combined then added to the jacketed reactor along with sodium bicarbonate (5 g) to quench the reaction. The mixture was stirred for an additional 50 minutes while allowing the mixture to warm to room temperature. The polymer generated was removed from a dry box and slowly added to ethanol (8 L) to precipitate the polymer. The supernatant was decanted to isolate the solid polymer, which was washed with ethanol. Octadecyl-3-(3,5-di-tert-butyl-4-hydroxyphenyl)-propionate (1 g, also known as IRGANOX® 1076 from Ciba® Inc.) was added as an antioxidant and the polymer was dried under a vacuum at 50° C. Yield=770 g (80%). An example $^1$H NMR spectrum collected from analysis of the polymer product is shown in FIG. 1. An example $^{13}$C NMR spectrum is shown in FIG. 2. Based on $^{13}$C NMR analyses, the cis/trans ratio of the polymer product was found to be 19:81. Analysis of the polymer product by gel permeation chromatography (GPC) revealed that the polymer product had a molecular weight ($M_w$) of 530 kDa and an $M_w/M_n$ of 2.0.

Example 2. Homopolymer Synthesis. Commercial cyclopentene (Sigma-Aldrich, 96%) was purified by passing it through a column of activated alumina to yield neat cyclopentene. 1-Hexanol (3.03 mmol) was added dropwise to a solution of triisobutylaluminum (3.03 mmol) in toluene (80 mL) at −35° C. The temperature of the reaction mixture was allowed to warm to 20° C. to which a solution of tungsten hexachloride (1.52 mmol) in toluene (20 mL) was added. The resulting mixture was stirred for 15 minutes at 20° C. to yield a catalyst composition, which was added to the neat cyclopentene (3.03 mmol) at 20° C. After 18 hours under mechanical stirring, a solution of butylated hydroxytoluene (6.05 mmol) in a mixture of ethanol (20 mL) and toluene (50 mL) was added. Dichloromethane (400 mL) was then added to the mixture, which was then poured into ethanol (1.5 L) to precipitate a polymer product. The polymer product was washed with ethanol (3×0.5 L) and dried under a vacuum for 4 hours at 50° C. Yield=57%. Based on $^{13}$C NMR analyses, the cis/trans ratio of the polymer product was found to be 53:47. Analysis of the polymer product by GPC revealed that the polymer product had a molecular weight ($M_w$) of 287 kDa and a PDI of 1.84.

Example 3. Epoxidation of CPR Polymer. The polymer product from Example 1 (0.15 g, 2.2 mmol alkene bond) was dissolved in dueterochloroform (3 mL) in a vial and magnetically stirred overnight. Acetone (0.75 mL) and a solution of potassium bicarbonate (0.852 g $KHCO_3$ in 9 mL water) was added to the vial. Potassium hydrogen monopersulfate (CAS No. 70693-62-8, available as OXONE® from Sigma-Aldrich, 0.30 g) was dissolved in water (2.3 mL) and added to the vial. Acetonitrile (0.1 mL) was then added to the vial. The vial was closed with a septum cap equipped with a bleed needle to relieve any pressure. The contents of the vial were stirred vigorously at about 1550 rpm at room temperature for about 4 hours.

Figure 3:
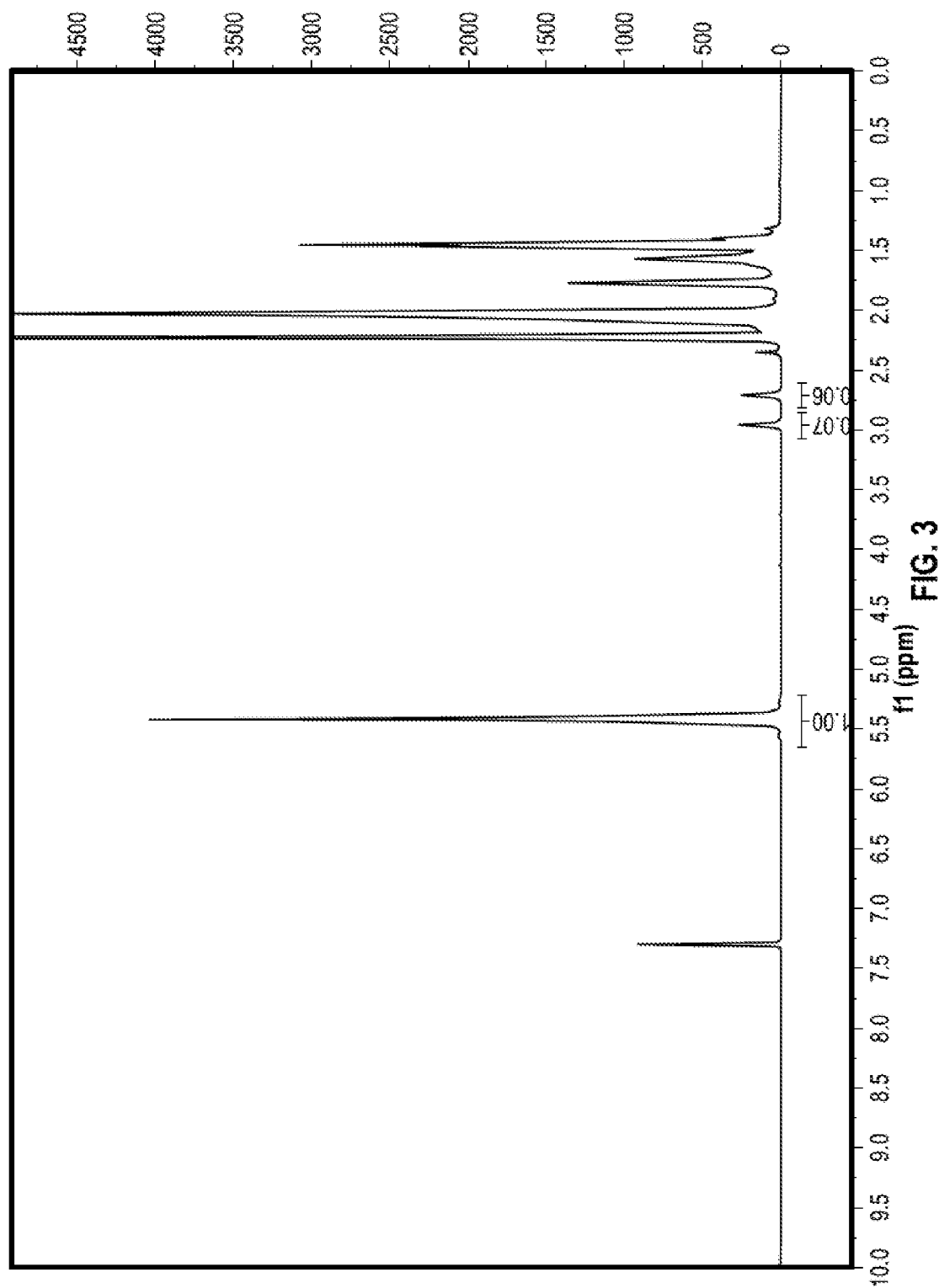
FIG. 3 depicts a $^1$H NMR spectrum collected from a sample of epoxidized CPR prepared according to Example 3.

Every hour (i.e., at 1 hour, 2 hours, 3 hours, and 4 hours) a sample was removed for $^1$H NMR analysis. Before removing a sample, the stirring was stopped and the reaction mixture was allowed to separate into phases. Using a syringe with a needle, 0.1 mL of the bottom organic layer was removed and transferred to a 4 mL vial. Samples were prepared for NMR analysis using the following procedure. Deuterochloroform (1 mL) was added to dilute the sample. Water (1 mL) was also added and the aqueous and organic phases were allowed to separate. The bottom organic layer was transferred to a new vial to which water (1 mL) was added, the phases were allowed to separate and the bottom organic layer was once again transferred to a new vial. Once again, water (1 mL) was added, the phases were allowed to separate, and the bottom organic layer was transferred to a new vial. The organic layer was then dried over anhydrous sodium sulfate and filtered through a syringe filter into a NMR tube. An example $^1$H NMR spectrum collected from analysis of the polymer product is shown in FIG. 3. $^1$H NMR analyses revealed that the conversion of alkene bonds to epoxides was 12%. The epoxide content per $^1$H NMR stayed constant in the samples collected at each of the 1 hour, 2 hour, 3 hour, and 4 hour sampling time points, indicating that epoxidation did not proceed further after 1 hour of reaction time.

Figure 4:
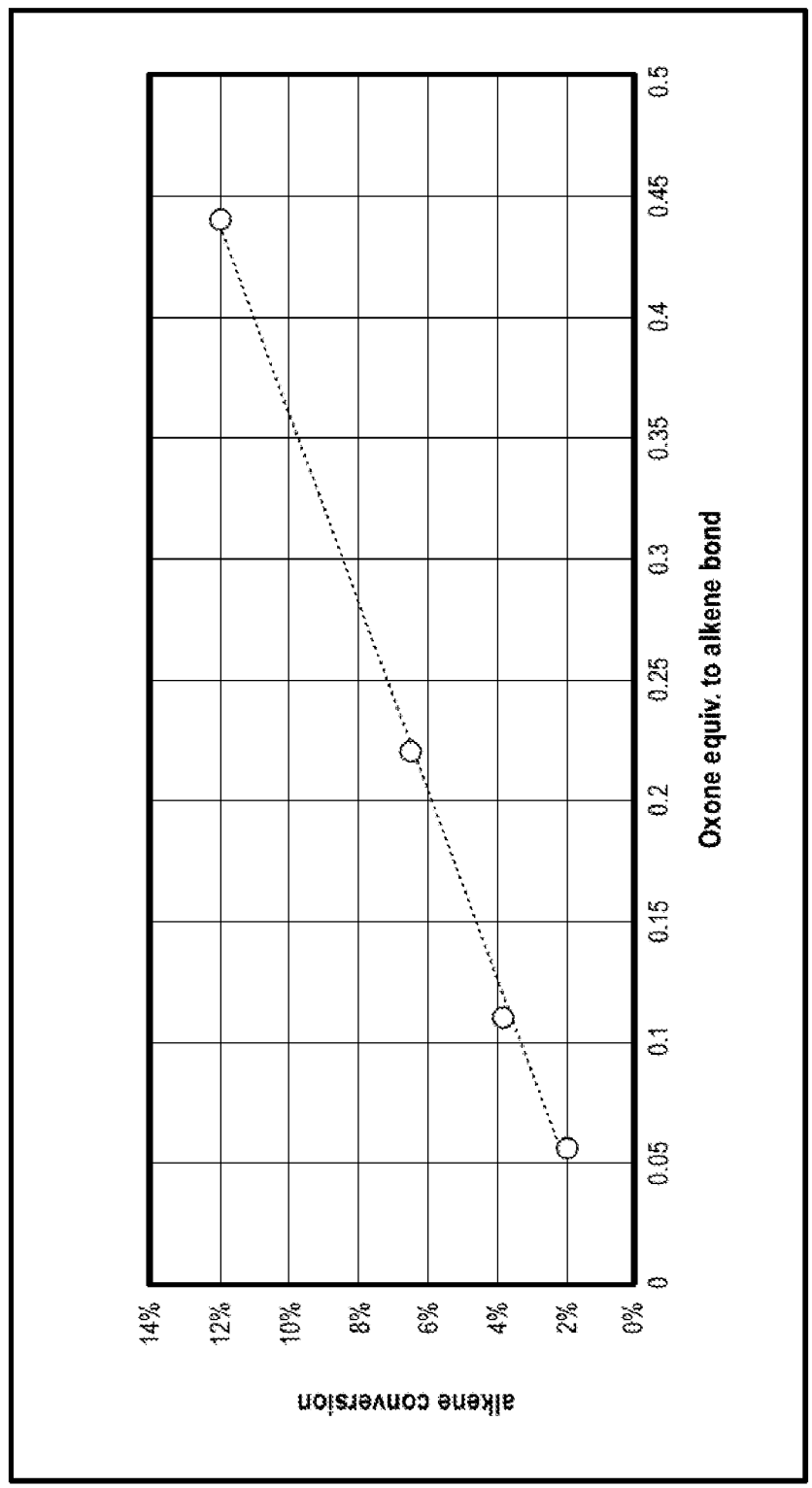
FIG. 4 illustrates the relationship between oxidant and alkene conversion in CPR epoxidation.

Reactions were carried out under identical reaction conditions as described above using differing amounts of potassium hydrogen monopersulfate. When performing the epoxidation reactions using 0.15 g, 0.075 g, or 0.038 g of potassium hydrogen monopersulfate (equal to a number of oxone per alkene bond of 0.22, 0.11, 0.056, respectively, and for the above reaction 0.44) the conversion of alkene bond to epoxide was 6.5%, 3.8%, and 1.96%, respectively. In all reactions, conversion did not change after 1 hour of reaction time. The linear relationship of potassium hydrogen monopersulfate equivalents versus the alkene conversion to epoxide is illustrated in the graph depicted in FIG. 4.

Example 4. Epoxidation of CPR Polymer. Polymer product from Example 1 (20 g) was dissolved in chloroform (400 mL) in a 2 L round bottom flask at room temperature. The mixture was stirred overnight. Potassium hydrogen monopersulfate (OXONE®, 4.52 g) was dissolved in purified (NANOPURE™) water (300 mL), which was then slowly added to the round bottom flask. Acetonitrile (13 mL) was then added and the mixture was vigorously stirred at room temperature for 2 hours. After 2 hours, the stirring was stopped and the reaction mixture was allowed to separate into phases. Using a separatory funnel, the organic layer was removed and washed with purified (NANOPURE™) water twice. The organic layer was then poured into excess ethanol and stirred vigorously. The precipitated solid was isolated, washed with ethanol twice, and then dried in a vacuum at 40° C. overnight under a nitrogen atmosphere. Yield=19.9 g. Based on $^1$H NMR analyses, the conversion of alkene bond to epoxide was 2.4%. Based on $^{13}$C NMR analyses, the cis/trans ratio of the polymer product was found to be 9:91.

Example 5. Epoxidation of CPR Polymer. Polymer product from Example 1 (20 g) was dissolved in chloroform (400 mL) in a 2 L round bottom flask at room temperature. The mixture was stirred overnight. Acetone (100 mL) and a solution of potassium bicarbonate (113.6 g KHCO$_3$ in 400 mL water) was added to the flask. Potassium hydrogen monopersulfate (OXONE®, 40 g) was dissolved in purified (NANOPURE™) water (300 mL), which was then slowly added to the round bottom flask. Acetonitrile (13 mL) was then added and the mixture was vigorously stirred at room temperature for 2 hours. After 2 hours, the stirring was stopped and the reaction mixture was allowed to separate into phases. Using a separatory funnel, the organic layer was removed and washed with purified (NANOPURE™) water twice. The organic layer was then poured into excess isopropanol and stirred vigorously. The precipitated solid was isolated, washed with isopropanol twice, and then dried in a vacuum at 40° C. for 3 days under a nitrogen atmosphere. Yield=20.9 g white rubber. Based on $^1$H NMR analyses, the conversion of alkene bond to epoxide was 8.7%. Based on $^{13}$C NMR analyses, the cis/trans ratio of the polymer product was found to be 12:88.

Example 6. Epoxidation of CPR Polymer. Polymer product from Example 2 (30 g) was dissolved in chloroform (600 mL) in a 3 L round bottom flask at room temperature. The mixture was stirred overnight. Acetone (150 mL) and a solution of potassium bicarbonate (170.4 g KHCO$_3$ in 600 mL purified (NANOPURE™) water) was added to the flask. Potassium hydrogen monopersulfate (OXONE®, 6.78 g) was dissolved in purified (NANOPURE™) water (450 mL), which was then slowly added to the round bottom flask. Acetonitrile (19.5 mL) was then added and the mixture was vigorously stirred at room temperature for 2 hours. After 2 hours, the stirring was stopped and the reaction mixture was allowed to separate into phases. Using a separatory funnel, the organic layer was removed and washed with purified (NANOPURE™) water twice. The organic layer was then poured into excess ethanol and stirred vigorously. The precipitated solid was isolated, washed with ethanol twice, and then dried in a vacuum at 40° C. overnight under a nitrogen atmosphere. Yield=28.0 g of a clear colorless rubber. Based on $^1$H NMR analyses, the conversion of alkene bond to epoxide was 2.6%. Based on $^{13}$C NMR analyses, the cis/trans ratio of the polymer product was found to be 48:52.

Example 7. Homopolymer synthesis. Commercial cyclopentene was purified by passing through alumina column. (2iPrPhO)$_2$AlCl 1.0 g was added to the solution of WCl$_6$ in toluene (20 mL) and stirred for 1 hour at room temperature to form Mixture A. Then, under nitrogen, to a solution of cyclopentene (200 g) in toluene (700 mL), Et$_3$Al 0.345 g was added and then cooled to 0° C. to form Mixture B. Mixture A was then added to Mixture B while stirring. After 3 hours at 0° C. and still under nitrogen, a solution of BHT 0.675 g in EtOH (50 mL) and toluene (150 mL) was added. The resultant mixture was then added to EtOH (1 L) under intense mechanical mixing. The formed homopolymer was washed with EtOH (3×0.5 L) and dried in a vacuum at 50° C. for 4 hours. Isolated yield: 159.6 g (80%). Cis/Trans ratio (based on $^{13}$C NMR):14/86. Mw:218 kDa. Mw/Mn:1.78

Example 8. Catalyzed Epoxidation. The homopolymer product from Example 7 was dissolved in chloroform (30 mL) in a 500 mL round bottom flask and stirred overnight. Acetone (7.5 mL) and a solution of potassium bicarbonate (8.52 g KHCO$_3$ in 90 mL purified (NANOPURE™) water) was added to the flask. Potassium hydrogen monopersulfate (OXONE®, 1.7 g) was dissolved in purified (NANOPURE™) water (90 mL). Copper sulfate pentahydrate (0.0135 g) was dissolved in a mixture of acetonitrile (1 mL) and purified (NANOPURE™) water (4 mL) and added to the contents of the round bottom flask slowly. The mixture was vigorously stirred at room temperature for 4 hours. After 4 hours, the stirring was stopped and the reaction mixture was allowed to separate into phases. Using a separatory funnel, the organic layer was removed and washed with purified (NANOPURE™) water twice. The solvent in the organic layer was then removed by rotary evaporation. The resulting polymer was dried in a vacuum at 40° C. overnight under a nitrogen atmosphere. Based on $^1$H NMR analyses, the conversion of alkene bond to epoxide was 80%. Based on $^{13}$C NMR analyses, the polymer product was found to be almost exclusively trans.

Example 9. Epoxidation of CPR Polymer. Polymer product from Example 1 (30 g) was dissolved in chloroform (600 mL) in a 3 L round bottom flask at room temperature. The mixture was stirred overnight. Acetone (150 mL) and a solution of potassium bicarbonate (170.4 g KHCO$_3$ in 600 mL purified (NANOPURE™) water) was added to the flask. Potassium hydrogen monopersulfate (OXONE®, 6.78 g) was dissolved in purified (NANOPURE™) water (450 mL), which was then slowly added to the round bottom flask. Acetonitrile (19.5 mL) was then added and the mixture was vigorously stirred at room temperature for 2 hours. After 2 hours, the stirring was stopped and the reaction mixture was allowed to separate into phases. Using a separatory funnel, the organic layer was removed and washed with purified (NANOPURE™) water twice. The organic layer was then poured into excess ethanol and stirred vigorously. The precipitated solid was isolated, washed with ethanol twice, and then dried in a vacuum at 40° C. overnight under a nitrogen atmosphere. Yield=28.86 g. Based on $^1$H NMR analyses, the conversion of alkene bond to epoxide was 2%. Based on $^{13}$C NMR analyses, the cis/trans ratio of the polymer product was found to be 17:83.

Figure 5:
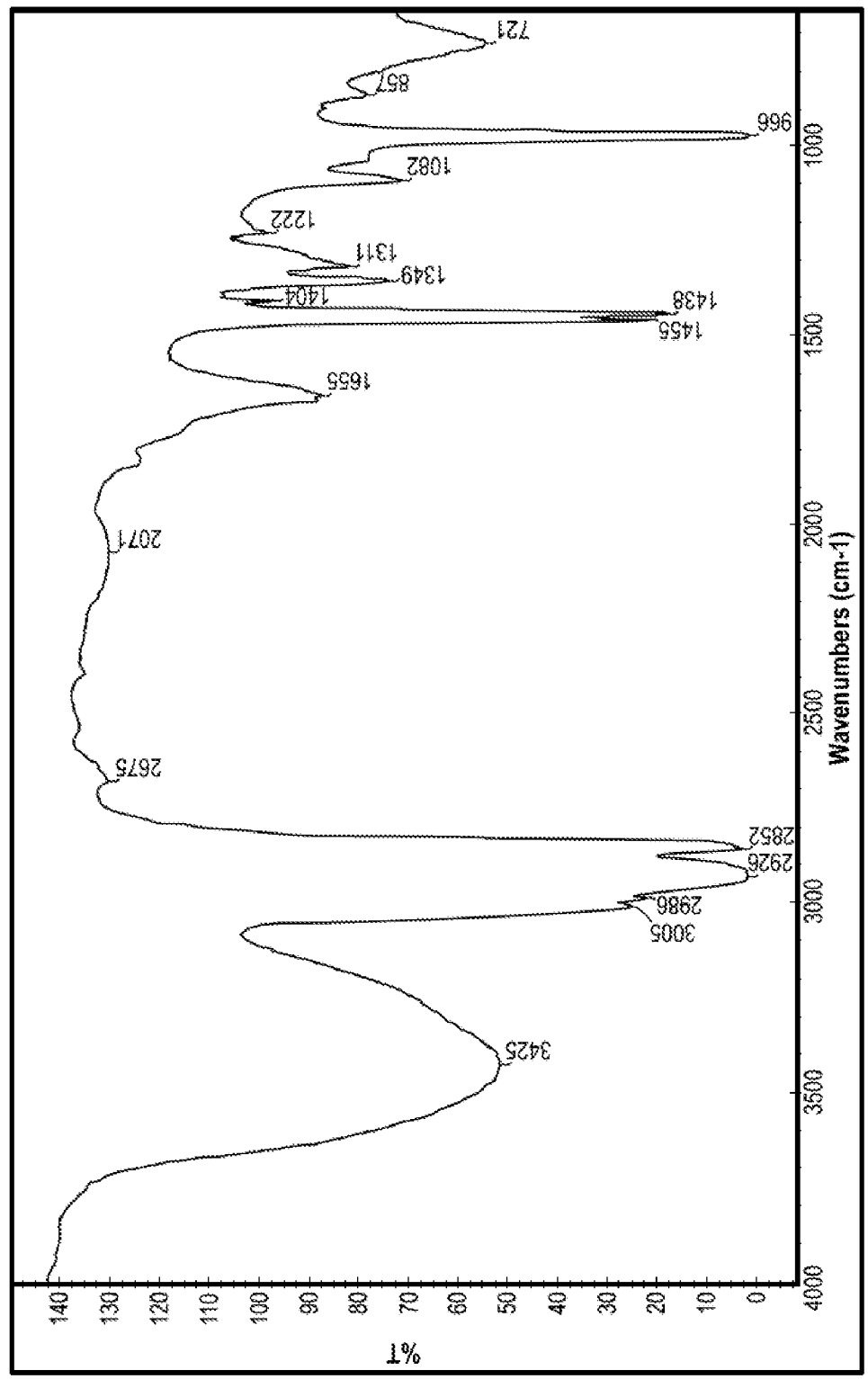
FIG. 5 depicts an FTIR spectrum collected from a sample of hydrolyzed epoxidized CPR prepared according to Example 9.
Figure 6:
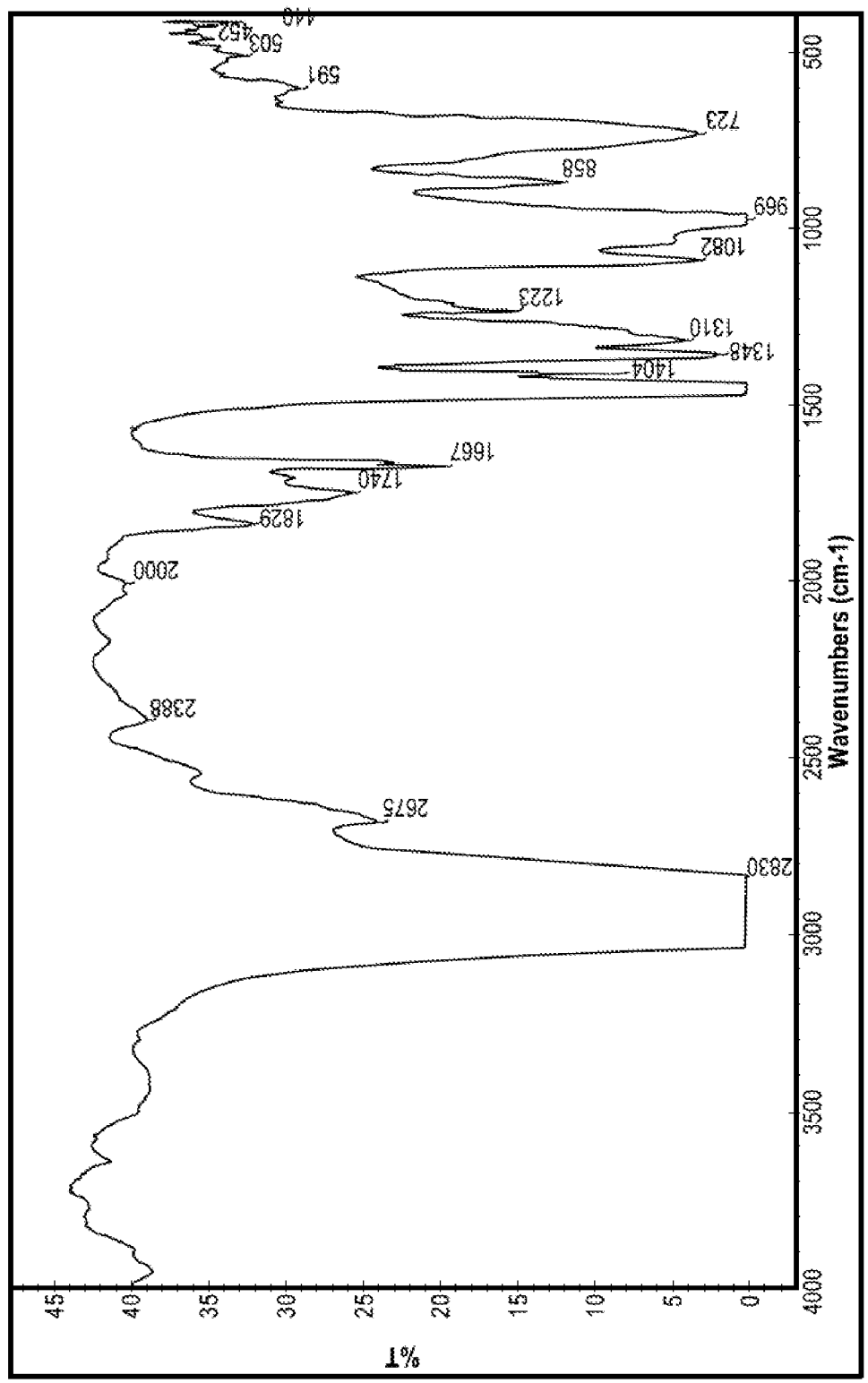
FIG. 6 depicts an FTIR spectrum collected from a sample of un-modified CPR prepared according to Example 8.

Example 10. Hydrolysis of Epoxidized CPR Polymer. Epoxidized polypentenamer from Example 8 (20 g) was dissolved in tetrahydrofuran (200 mL) and stirred overnight. An aqueous solution of sulfuric acid was prepared by adding concentrated sulfuric acid (5 g, d=1.84, 2.8 mL) to purified (NANOPURE™) water (240 mL). The aqueous solution of sulfuric acid was then added dropwise to the polymer/tetrahydrofuran solution while stirring. Stirring was continued for 4 hours. Polymer precipitated from the reaction mixture. While not wishing to be bound by theory, this may be because the hydroxyl-functionalized polymer has limited solubility. The precipitated polymer was recovered, cut into small pieces to increase the surface area, washed with purified (NANOPURE™) water twice, followed by an aqueous solution of sodium bicarbonate, with purified (NANOPURE™) water again, then with methanol three times. The product was dried in a vacuum under an atmosphere purged slightly with nitrogen. Yield=22.437 g. The polymer product had very limited solubility in many common organic solvents like chloroform, toluene, dichloromethane, acetonitrile, and tetrahydrofuran. Analysis of the product by FTIR microscopy revealed a broad peak at 3425 cm$^{-1}$, which is indicative of the hydroxyl group. FIG. 5 depicts an example FTIR microscopy spectrum of the hydrolyzed epoxidized CPR polymer with the broad peak at 3425 cm$^{-1}$ labelled. This peak is not observed in the original starting polymer, as can be seen in the example FTIR microscopy spectrum in FIG. 6, collected from the original starting polymer material.

Example 11. Rubber Compounding Testing. All rubber compounds were prepared with a measuring mixer (BRABENDER® mixer) utilizing a tripartite mixer bowl. After mixing, each rubber compound was tested for cure behavior with a dynamic mechanical analyzer (Premiere™ RPA, available from Alpha Technologies) or a curemeter (MDR 2000™). Testing was carried out at 160° C. for 45 minutes (at 1.67 Hz and 7.0% strain). For each rubber compound, one rectangular pad (7.62 cm inch by 15.24 cm and approximately 2.0 mm thick) was cured under high pressure in a mold maintained at a temperature of 160° C. for 2 minutes plus the cure test time ($t_{c90}$) for the corresponding rubber compound.

A rectangular strip was die-cut out from the cured rectangular pad for each rubber compound for dynamic temperature ramp testing, which was carried out on an Advanced Rheometric Expansion System (Rheometric Scientific, Inc.). The dynamic ramp testing was carried out at 10 Hz at a heating rate of 2° C./min, employing a torsional rectangular geometry. The strain amplitude was at 0.20% below 0° C. (or 10° C.) while it was raised to 2.0% at and above 0° C. (or 10° C.). Six data points were collected per minute and all tests ended at 100° C.

Example 12. Silica-filled rubber compounds were made from a blend of styrene-butadiene rubber (SBR) and polypentenamer rubber (CPR). The SBR is NIPOL® NS116R (from Nippon Zeon Co., Ltd). Formulations are listed in Table 1 below. Each rubber compound employs a different CPR, which is identified by the Example above disclosing its preparation.

TABLE 1

| Component | Compound 1 (reference) | Compound 2 | Compound 3 | Compound 4 |
|---|---|---|---|---|
| SBR (phr) | 60 | 60 | 60 | 60 |
| CPR (phr) | Example 1, 40 | Example 4, 40 | Example 5, 40 | Example 10, 40 |
| Silica (phr) | 67 | 67 | 67 | 67 |
| Silane (phr) | 11.5 | 11.5 | 11.5 | 11.5 |
| Stearic Acid (phr) | 2.5 | 2.5 | 2.5 | 2.5 |
| DBDA (phr) | 2 | 2 | 2 | 2 |
| Naphthenic Process Oil (phr) | 15 | 15 | 15 | 15 |
| ZnO (phr) | 2 | 2 | 2 | 2 |
| DPG (phr) | 1.4 | 1.4 | 1.4 | 1.4 |
| CBS (phr) | 1.19 | 1.19 | 1.19 | 1.19 |
| Sulfur (phr) | 1.4 | 1.4 | 1.4 | 1.4 |
| Total (phr) | 203.99 | 203.99 | 163.99 | 163.99 |

Figure 7:
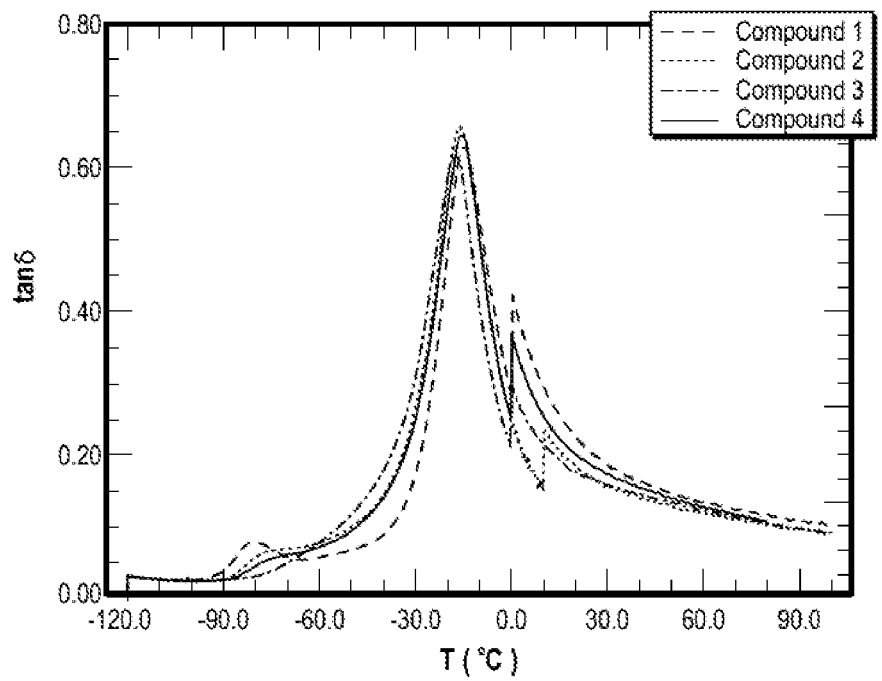
FIG. 7 illustrates the relationship between tan δ and temperature of rubber compounds prepared according to Example 12.

Variation in tan delta (tan δ) with temperature was tested for each of the rubber compounds listed in Table 1. FIG. 7 provides the results of one set of these experiments. For rubber compound 1 (reference), which contains the non-epoxidized CPR, a minor peak in tan δ at low temperature is identifiable. This peak may correspond to the CPR phase. The shape and location of this peak is modified in the traces corresponding to rubber compound 2 and rubber compound 4, each being about 2% epoxidized. In the trace for rubber compound 3, which is about 9% epoxidized, this peak appears nearly absent. The temperature position that corresponds to the major peak in tan δ ($T_{pk\ tan\ \delta}$) as well as G* at −20° C. for each rubber compound listed in Table 1 is summarized in Table 2. These properties may aid in predicting winter traction performance of each rubber compound.

TABLE 2

| | Compound 1 (reference) | Compound 2 | Compound 3 | Compound 4 |
|---|---|---|---|---|
| $T_{pk\ tan\ \delta}$ (major) (° C.) | −14.8 | −16.0 | −17.5 | −15.4 |
| G* @ −20° C. (MPa) | 255.7 | 135.4 | 115.2 | 177.5 |

Similar to the minor peak at low temperature discussed above, the location and shape of the major peak in tan δ at high temperature is also shifted for each of the rubber compounds containing epoxidized CPR (rubber compounds 2, 3, and 4). This also alters G* at −20° C. for each of rubber compounds 2, 3, and 4 as well. Without wishing to be bound by theory, the changes in shape and position of the peaks at tan should be related to the varied compatibility between CPR and SBR arising from backbone modification (e.g., epoxidation).

Example 13. Silica-filled rubber compounds were made of a blend of SBR and CPR at a ratio of 60:40 SBR:CPR. The SBR is NIPOL® NS116R. Formulations are listed in Table 3 below. Each rubber compound employs a different CPR, which is identified by the Example above disclosing its preparation.

TABLE 3

| Component | Compound 5 (reference) | Compound 6 |
| --- | --- | --- |
| SBR (phr) | 60 | 60 |
| CPR (phr) | Example 2, 40 | Example 6, 40 |
| Silica (phr) | 67 | 67 |
| Silane (phr) | 11.5 | 11.5 |
| Stearic Acid (phr) | 2.5 | 2.5 |
| DBDA (phr) | 2 | 2 |
| Naphthenic Processing Oil (phr) | 15 | 15 |
| ZnO (phr) | 2 | 2 |
| DPG (phr) | 1.4 | 1.4 |
| CBS (phr) | 1.19 | 1.19 |
| Sulfur (phr) | 1.4 | 1.4 |
| Total (phr) | 203.99 | 163.99 |

Figure 8:
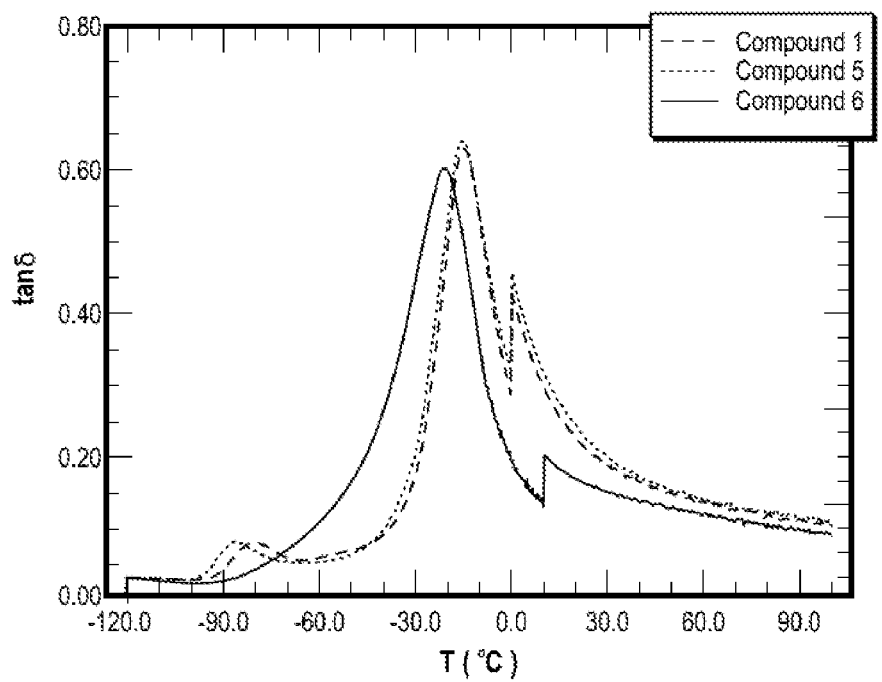
FIG. 8 illustrates the relationship between tan δ and temperature of rubber compounds prepared according to Example 13.

Variation in tan δ with temperature was tested for each of the rubber compounds listed in Table 3. FIG. 8 provides the results of one set of these experiments, along with the trace of rubber compound 1, which has a cis/trans ratio of 19:81, from Table 1. Comparing the trace corresponding to rubber compound 5 to the trace corresponding to rubber compound 1, the minor peak in tan δ at low temperature occurs at a different temperature position, which may reflect the difference in glass transition temperature ($T_g$) for the two non-epoxidized CPR formulations. On the other hand, the position of the major peak in tan δ at high temperature appears essential the same in the traces corresponding to rubber compound 1 and rubber compound 5. This may be due to the presence of the same SBR phase. For rubber compound 6, which contains a CPR having a cis/trans ratio of 53/47 and a 2.6% epoxidation, the major peak in tan δ appears shifted to 20.9° C., the lowest temperature shift exhibited in the traces of each of the six rubber compounds examined.

The temperature position that corresponds to the major peak in tan δ ($T_{pk\ tan\ \delta}$) as well as G* at −20° C. for each rubber compound listed in Table 3 is summarized in Table 4. These properties may aid in predicting winter traction performance of each rubber compound.

TABLE 4

| | Compound 5 (reference) | Compound 6 |
| --- | --- | --- |
| $T_{pk\ tan\ \delta}$ (major) (° C.) | −15.0 | −20.9 |
| G* @ 20° C. (MPa) | 174.3 | 52.3 |

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the present invention. The invention illustratively disclosed herein suitably may be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces.

The invention claimed is:

1. A rubber compound comprising:
an epoxidized polypentenamer rubber (CPR) and/or a hydrolyzed epoxidized CPR, comprising a $C_5$ unit having the structure:

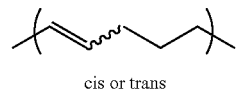

cis or trans and at least one epoxidized unit or hydrolyzed epoxidized unit having the structure:

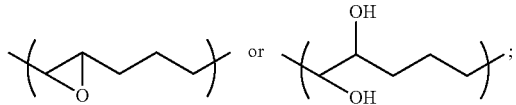

and
a filler comprising silica particles.

2. The rubber compound of claim 1, wherein the epoxidized CPR and/or the hydrolyzed epoxidized CPR has a trans content of 60% or greater.

3. The rubber compound of claim 1, wherein the epoxidized CPR and/or the hydrolyzed epoxidized CPR has a cis content of 50% or greater.

4. The rubber compound of claim 1, wherein the epoxidized CPR and/or the hydrolyzed epoxidized CPR has an epoxide content of 0.5% to 30% based on a number of alkenes converted to epoxides.

5. The rubber compound of claim 1, wherein the silica is present at 10 parts per hundred parts of rubber (phr) to 200 phr.

6. The rubber compound of claim 1, further comprising:
50 parts per hundred parts of rubber (phr) to 90 phr of a styrene butadiene rubber (SBR), a natural rubber (NR), and/or a butadiene rubber (BR); and
10 phr to 50 phr of the epoxidized CPR and/or the hydrolyzed epoxidized CPR,
wherein the SBR, the NR, the BR, the epoxidized CPR, and the hydrolyzed epoxidized CPR combined equal 100 parts.

7. The rubber compound of claim 6, having tan delta of −25° C. to −15° C.

8. The rubber compound of claim 6, having a G* at −20° C. of 25 MPa to 200 MPa.

* * * * *